United States Patent [19]

Lombard

[11] Patent Number: 4,880,347
[45] Date of Patent: Nov. 14, 1989

[54] LOAD-CARRYING ATTACHMENT FOR MOTOR VEHICLES

[75] Inventor: Jose O. Lombard, Miami, Fla.

[73] Assignee: Luis A. Gigueroa, Coral Gables, Fla.

[21] Appl. No.: 171,892

[22] Filed: Mar. 22, 1988

[51] Int. Cl.$^4$ .............................................. B60P 1/64
[52] U.S. Cl. ................................... 414/542; 414/543; 414/392; 414/399; 414/541; 414/635; 414/665; 187/9 R
[58] Field of Search ............... 414/391, 392, 396, 399, 414/401, 402, 495, 540, 541, 542, 634–636, 665, 666; 187/9 R, 9 E

[56] References Cited

U.S. PATENT DOCUMENTS

| | | |
|---|---|---|
| 2,702,678 | 2/1955 | Flock, Jr. |
| 2,732,087 | 1/1956 | Pratt |
| 2,812,868 | 11/1957 | Crile ................................... 414/542 |
| 2,962,180 | 11/1980 | Vossenberg |
| 2,993,607 | 7/1961 | Tapper |
| 3,295,881 | 1/1967 | Worthington ...................... 414/542 |
| 3,504,810 | 4/1970 | Walda |
| 3,563,341 | 2/1971 | Buitman |
| 3,715,046 | 2/1973 | Marklund |
| 3,945,516 | 3/1976 | Peck et al. |
| 4,249,842 | 2/1981 | Johnson |
| 4,365,921 | 12/1982 | Brouwer et al. .................... 414/347 |
| 4,415,302 | 11/1983 | Brouwer et al. ................. 414/664 X |
| 4,498,829 | 2/1985 | Spikes |
| 4,498,837 | 2/1985 | Kooi et al. ......................... 414/664 |
| 4,690,609 | 9/1987 | Brown ............................ 414/631 X |
| 4,699,558 | 10/1987 | Hagge et al. .................... 414/495 X |

FOREIGN PATENT DOCUMENTS

| | | | |
|---|---|---|---|
| 2732256 | 1/1979 | Fed. Rep. of Germany ...... | 414/542 |
| 3437142 | 4/1986 | Fed. Rep. of Germany ...... | 414/542 |
| 2091208 | 7/1982 | United Kingdom ................ | 414/679 |

Primary Examiner—Frank E. Werner
Attorney, Agent, or Firm—Roylance, Abrams, Berdo & Goodman

[57] ABSTRACT

A load-carrying attachment for a vehicle to unload cargo from or load cargo onto the vehicle. The attachment includes a pair of spaced horizontal support beam assemblies having first and second ends. A cross beam connects the first ends of the beam assemblies to form a fixed frame with the beam assemblies. The cross beam is attachable to the vehicle such that the assembly is movable along the periphery of the vehicle. The attachment includes a pair of leg members, one of the leg members being attached to one of the support beam assemblies. The leg members include hydraulic cylinders for raising and lowering the support beam assemblies and wheel assemblies which can be employed as wheels when moving the attachment or as bases when the attachment is being employed to load or unload cargo. The attachment further includes a mast which is slidably attached to the beam assemblies such that it is movable along the beam assemblies. The mast is positioned between the beam assemblies. A carriage is slidably attached to the mast such that it is movable along an axis parallel to the longitudinal axis of the mast. A load engaging member is attachable to the carriage. When the load engaging member is engaging a load and attached to the carriage, the carriage and mast can be operated to move the load onto or off of the vehicle.

18 Claims, 10 Drawing Sheets

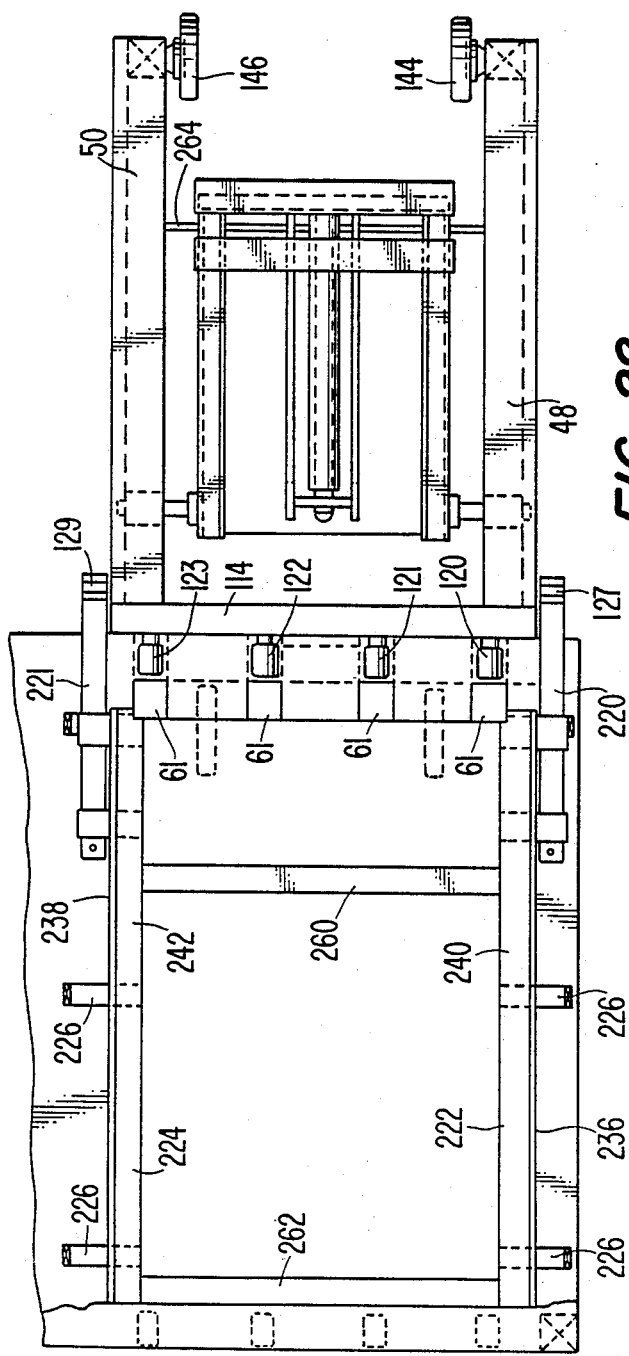

LOAD-CARRYING ATTACHMENT FOR MOTOR VEHICLES

FIELD OF THE INVENTION

This invention relates to devices for loading cargo onto and unloading cargo off of motor vehicles. More particularly, this invention relates to such devices which may be attached to motor vehicles and include elevators for raising and lowering the cargo.

BACKGROUND OF THE INVENTION

The cost of material handling is a significant portion of the cost of certain items, such as items of large bulk and/or of relatively heavy weight. Examples of such items are building materials, i.e., lumber, concrete blocks, pipe, shingles, steel beams, etc.

Such material handling includes shipping the items from the manufacturer through the distribution channel to the retailer and from the retailer to the job site at which the materials will be employed. The handling of the materials from the manufacturer through the distribution channels is usually accomplished efficiently and at minimal cost, due to the large quantities of goods being handled. However, the handling of the material from the retailer to the job site usually is not as efficient and thus greatly, and unnecessarily, increases the cost of such goods.

That is, once the items have been purchased at a retail outlet, they must be transported to the job site. Much effort and cost may be expended in delivering these items to the job site.

For purposes of illustration, the handling and transport of building materials is addressed below. While the handling of building materials is specifically addressed, the devices according to this invention can be employed to handle many other objects. Building materials are discussed merely as an example of the types of goods which can be handled, and not as a limitation on the scope of the invention.

Building materials are usually delivered from a retail establishment or warehouse to a job site via a flat bed truck, delivery van or other cargo carrying vehicle. The building materials are usually loaded onto the cargo vehicle by a forklift at the retail establishment or warehouse. Commonly, the smaller building materials, such as concrete blocks, are stacked on wood pallets of uniform size. These wood pallets include spaced layers of boards. The fork of the forklift is inserted into the space between the layers and is operated to lift the pallet and load of concrete blocks onto the cargo vehicle. Drums of materials, lumber, pipe, shingles and other heavy materials are usually handled in the same manner. Since most business establishments that sell such building materials have a forklift available, the loading of the vehicle is not usually much of a problem or expense.

The difficulties in delivering items such as building materials usually arise at the job site to which such materials are being delivered.

If a forklift is available at the job site, then the materials can be unloaded in the same manner that they were loaded. However, frequently, a forklift is not available at the job site since such materials are usually being delivered to a construction site at which construction has not yet begun or is just getting underway. Moreover, the job site may be a single new house, a few new houses or an addition to an existing house. The small size of these jobs does not merit the expense of having a forklift on the job site.

While an apparent solution would be to haul a forklift on the vehicle with the load, this is not a viable solution because the retail establishment or warehouse does not usually have spare forklifts to send out with every truck, the retailer does not want to be liable for damage or injuries incurred using their forklift under these circumstances, and the forklift would take up valuable payload space and weight on the vehicle cargo bed.

Therefore, often a forklift is not available at the job site to unload building materials from a cargo vehicle. Under these conditions, the most frequently used method of unloading the vehicle s hand labor. However, this is dangerous, costly and time consuming work. It is dangerous in that the building materials include heavy items which may cause injury to the workers if mishandled or if a worker has an accident while handling the items (such as slipping in mud).

Moreover, this work is costly since a great deal of time is involved in removing heavy and/or bulky items from a motor vehicle by manual labor. This problem is compounded because the vehicles are usually loaded by the forklift at the retail establishment.

Further the unloading process usually must involve at least two workers due to the weight and/or bulk of some of the building materials.

This requires that, at the least, the driver have a helper to unload the vehicle. In circumstances when the materials are being delivered to a new job site, a helper may not be readily at hand. This may result in further delay as a helper is located and arrives at the job site, or to avoid this delay, a helper must travel with the driver.

If the helper travels with the vehicle, this greatly increases the labor costs for delivering the goods. If the helper is to be supplied at the job site, this may make the delivery schedule critical to assure that the vehicle arrives at the job site when the worker is present and available to help unload. Moreover, the use of a worker at the construction site slows down the construction work as the worker's time is spent unloading vehicles and not doing actual construction tasks.

In view of these problems, certain types of mechanisms have been developed to help unload vehicles with heavy or bulky payloads at job sites.

One type of such devices is the hydraulic lift tailgate which is employed with a closed van. This is a tailgate which is normally perpendicular to the cargo bed of the closed van, but which may be oriented parallel to the bed of the closed van for lifting and lowering cargo. The tailgate can be hydraulically raised and lowered with a load on it to move the load from the level of the cargo bed of the closed van to the ground and vice versa. However, while this is an advance in the art, hydraulic lift tailgates still have many disadvantages.

First, the load must still be transferred from all locations on the cargo bed of the closed van to the hydraulic lift tailgate during the unloading process. Then once the load has been lowered to the ground, manual labor must again be employed to move the cargo from the tailgate to the ground. Thus, a substantial amount of manual labor is still involved. The only manual task which the hydraulic lift tailgate renders unnecessary is the lowering of the payload down from the vehicle bed to the ground, and vice versa.

Another mechanism which has been developed to unload such vehicles are built-in cranes. These cranes are built as part of the truck, either between the truck cab and truck bed or on the truck bed. These cranes have the disadvantage of being relatively expensive and undependable. Moreover, the cranes take up valuable payload space. That is, on vehicles having these built-in cranes, less space is available to carry the cargo, which in turn, means less profit per trip. Further, the cranes are heavy. This may permit the truck to carry less cargo weight since the crane takes up some of its maximum payload capacity.

Therefore, it is clear that neither the hydraulic lift tailgate or the equipping of cargo vehicles with built-in cranes is an adequate or optimum solution to the problem of unloading heavy and/or bulky cargo at a job site.

In view of this, many specialty devices have been developed which may be attached to cargo carrying vehicles for loading and unloading cargo. Examples of these devices are disclosed in U.S. Pat. No. 2,702,678 issued to Flock, Jr. on Feb. 22, 1955; U.S. Pat. No. 2,732,087 issued to Pratt on Jan. 24, 1956; U.S. Pat. No. 2,993,607 issued to Tapper on Jul. 25, 1961; U.S. Pat. No. 3,504,810 issued to Walda on Apr. 7, 1970; U.S. Pat. No. 3,715,046 issued to Marklund on Feb. 6, 1973; U.S. Pat. No. 3,945,516 issued to Peck et al on Mar. 23, 1976; U.S. Pat. No. 4,249,842 issued to Johnson on Feb. 10, 1981 and U.S. Pat. No. 4,498,829 issued to Spikes on Feb. 12, 1985.

Moreover, specialty forklift devices have been developed to address this problem. Such forklift devices are disclosed in U.S. Pat. No. 2,962,180 issued to Vossenberg on Nov. 29, 1960; U.S. Pat. No. 3,563,341 issued to Buitman on Feb. 16, 1971; U.S. Pat. No. 4,365,921 issued to Brouwer et al on Dec. 28, 1982; U.S. Pat. No. 4,415,302 issued to Brouwer et al on Nov. 15, 1983 and U.S. Pat. No. 4,498,837 issued to Kooi et al on Feb. 12, 1985.

However, all of these devices are limited in their use. The forklift devices must still be provided at each and every job site. The devices which are attachable to a vehicle, disclosed in the first listed patents, all have the limitation that they cannot remove loads of any size from all locations of the truck bed without manual labor, which is the same problem with the hydraulic lift tailgate.

Therefore, it is apparent that there still exists a need in the art for a load-carrying attachment for motor vehicles which can remove loads of all sizes from all locations on the truck bed. This invention addresses this need in the art, as well as other needs which are apparent to those skilled in the art once given this disclosure.

SUMMARY OF THE INVENTION

This invention provides a load-carrying attachment for a cargo carrying vehicle to unload cargo from or load cargo onto the vehicle. The attachment includes a pair of spaced horizontal support beam assemblies having first and second ends. The beam assemblies are connected and their first ends are attachable to the vehicle. The attachment comprises a pair of leg members, one of the leg members being attached to one of the support beam assemblies. The attachment also includes a mast which is slidably attached to the beam assemblies such that the mast is movable along the beam assemblies. The mast is positioned between the beams and is rotatably attached to the beams. Further, the attachment includes a carriage slidably attached to the mast such that the carriage can slide parallel to the longitudinal axis of the mast. A member is removably attachable to the carriage for engaging a load.

Some embodiments of this invention include a member attached to the vehicle for receiving the first ends of the support beam assemblies. This member may extend along the sides and back of the vehicle such that the attachment may be moved completely around the sides and back of the vehicle.

In other embodiments of this invention, a cross beam extends between and is attached to the first ends of the support beam assemblies. Rollers may be attached to the cross beam and engage the receiving member which is attached to the vehicle. The receiving member may be hollow tubing. The tubing may be attached underneath the bed of the vehicle.

In yet other embodiments of the invention, the leg members are attached to the second ends of the support beam assemblies and are extendable and retractable to vary the height of these second ends. The leg members may include a hydraulic cylinder having an extendable arm. Wheel members may be rotatably attached to the extendable arms. Moreover, the wheel members may be pivotably attached to the extendable arms such that the wheel members can be oriented in parallel or perpendicular to the extendable arms.

In further embodiments, the mast includes a cross beam and members attached on the ends of the cross beam that slidably engage the support beam assemblies. These members may be slide shoes.

The mast may also include spaced elongated upright members. The carriage may be slidable along these upright members. Further, the mast may include a hydraulic cylinder which is operable to raise and lower the carriage.

The carriage may have a front side which faces the first ends of the support beam assemblies and a back side which faces away from the first ends. The load engaging member is attachable to the carriage such that it may extend forward from the front side of the carriage or rearward from the back side of the carriage.

In some embodiments of this invention, the mast and carriage may have a position in which the mast and carriage do not extend above the top of the support beam assemblies.

The devices according to this invention have many advantages over the prior devices for loading cargo onto and unloading cargo off of cargo vehicles. Such advantages include the fact that the use of devices according to this invention minimizes the manual labor required to perform these tasks.

The devices according to this invention can be employed to unload a load from any location on the vehicle cargo bed without manual labor. Thus, loads at the front of the vehicle cargo bed can be engaged and removed as easily as loads located at the rear of the vehicles. This could not be previously done with the unloading devices for closed vans. Furthermore, with respect to the flat bed trucks, the devices are movable to any position on all sides and the back of the cargo bed of a flat bed truck.

Another advantage of devices according to this invention is that such devices can handle and transport items of almost any width and height. Items of excessive height and width can be loaded onto or unloaded from a cargo vehicle with these devices without manual labor.

A further advantage of these devices is that they are attachable to vehicles and may be carried under the bed of the vehicles to and from job sites. Thus, the devices may always be available, even at the most remote job site.

A further advantage is that the devices according to the invention may be stored under the vehicle cargo bed when not in use. The devices do not take up valuable payload space on the vehicle cargo bed. In the alternative, the devices can be easily removed from the vehicle to be employed with another vehicle, or for storage.

A further advantage is that the devices according to this invention are safe. No manual lifting of any items is involved. Moreover, the devices are very sturdy, stable and balanced when loads are being handled.

Other advantages include the fact that the devices according to this invention are easy to use and when properly used, quickly unload vehicles. This reduces the cost involved in loading and unloading cargo vehicles. Also, skilled labor is not necessary to operate the device.

Yet another advantage is that the devices according to this invention can be employed in uneven terrain and on sloped surfaces. The leg members can be individually employed to adjust the height of the support beam assemblies relative the ground surface.

A further advantage of these devices is that the devices can be easily and quickly installed on most existing cargo vehicles. Thus, the devices do not have to come as original equipment, but can be installed on motor vehicles already in use.

Certain embodiments of this invention will now be described with respect to the Figures, wherein:

BRIEF DESCRIPTION OF THE DRAWINGS

FIG. 27 is a partial top view of the embodiment of this invention illustrated in FIGS. 1-26, illustrating the embodiment being placed into its storage rack under a truck bed.

FIG. 28 is a rear view of the embodiment of this invention illustrated in FIGS. 1-27, illustrating the embodiment being placed into its storage rack under a truck bed.

DETAILED DESCRIPTION OF THE DRAWINGS

Figure 1:
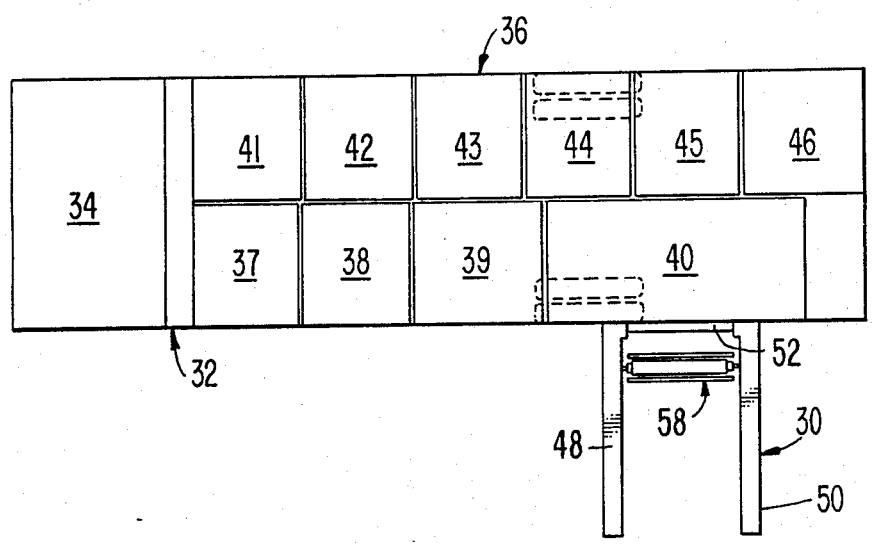
FIG. 1 is a top view of one embodiment of this invention affixed to a flat bed truck.

Referring to the Figures, in particular FIG. 1, one embodiment of this invention, attachment 30, is illustrated attached to truck 32. Truck 32 includes cab 34 and truck bed 36. Truck bed 36 is loaded with items 37-46. Items 37-46 can be of any type normally transported by truck. For purposes of illustration, the transport and handling of building materials such as cubes of concrete blocks on wood pallets, bundles of lumber, bundles of piping, stacks of shingles and barrels of asphalt are specifically addressed herein. However, it is to be understood that this invention is not limited to the handling of building materials. For example, the load-carrying attachments according to this invention can be employed to handle agricultural materials, such as fertilizers, herbicides, pesticides, etc.; military goods and items; etc.

Figure 2:
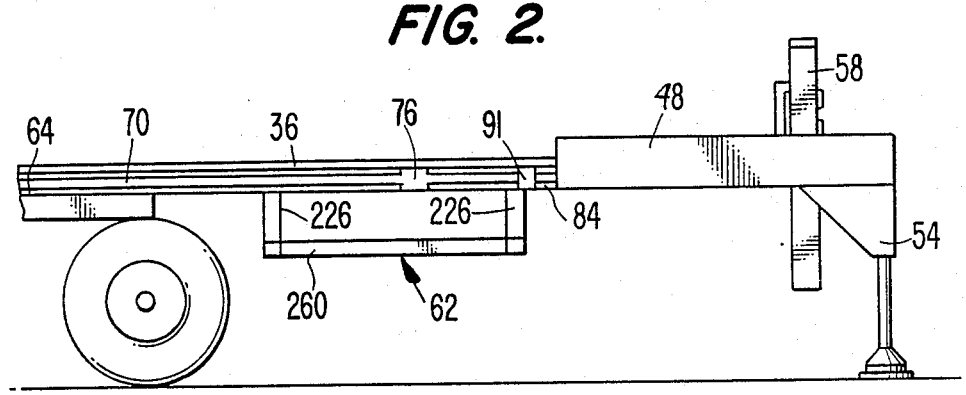
FIG. 2 is a partial side view of the embodiment of this invention illustrated in FIG. 1 in engagement with the rear end of a flat bed truck.
Figure 7:
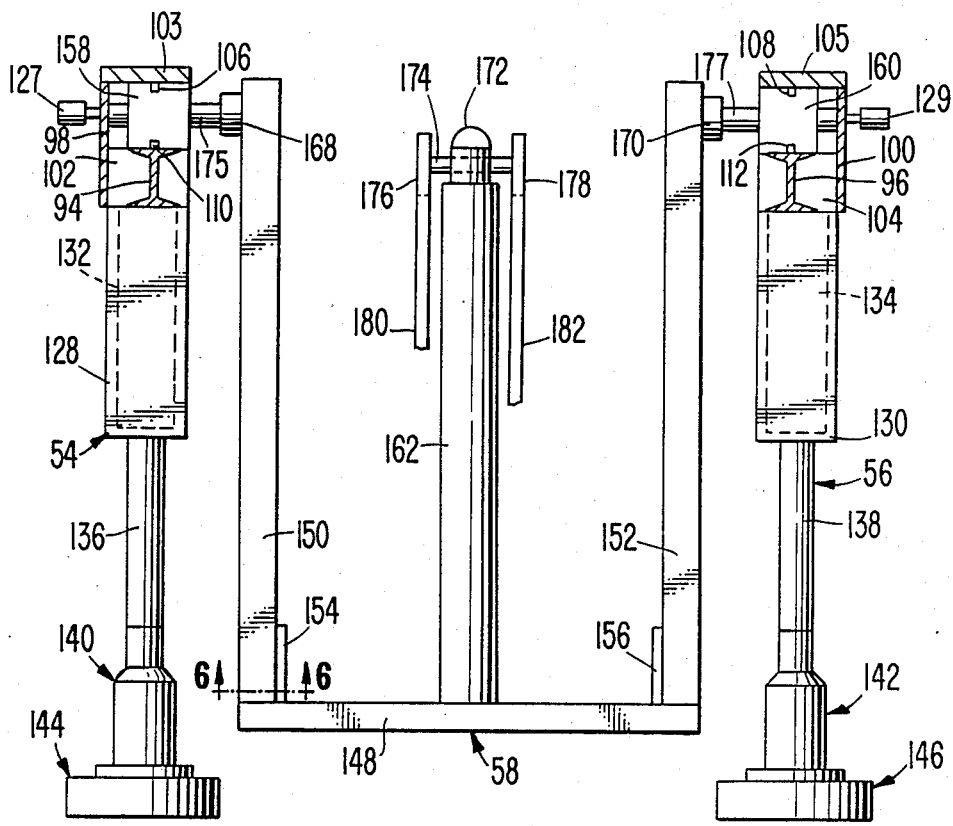
FIG. 7 is a partial rear view, partially cross-sectioned for clarity, of the mast, horizontal support beam assemblies and leg support assemblies of the embodiment of this invention illustrated in FIGS. 1—6.

Attachment 30 includes horizontal support beam assemblies 48 and 50, front cross beam assembly 52, leg support assemblies 54 and 56 and elevator assembly 58 (see FIGS. 1, 2 and 7).

Figure 17:
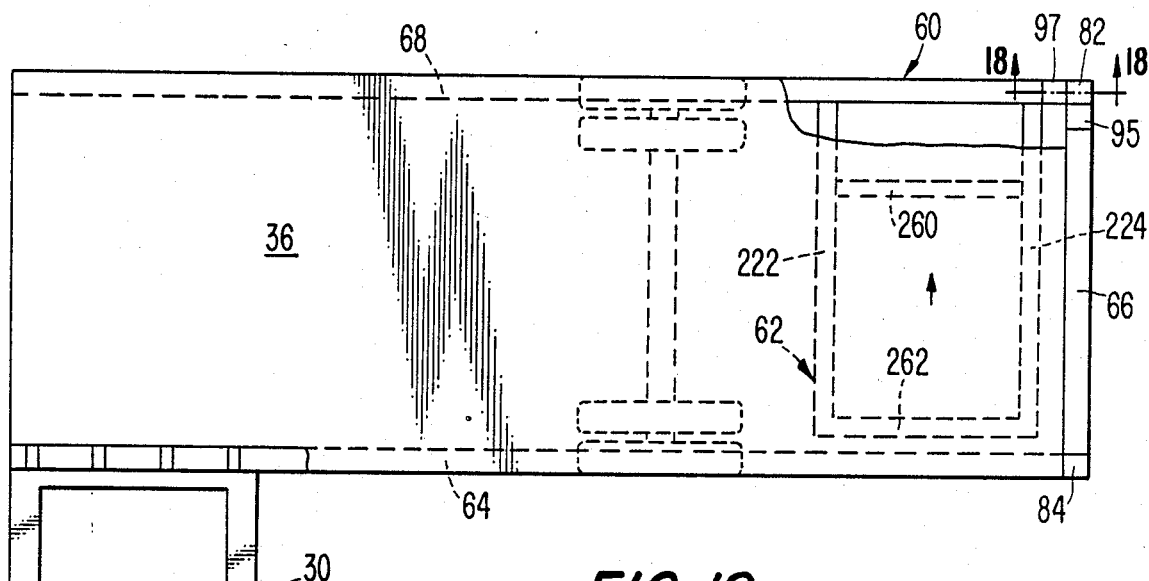
FIG. 17 is a top view, partially cut away for clarity, of the embodiment of this invention illustrated in FIGS. 1-16 attached to the side of a truck bed.
Figure 19:
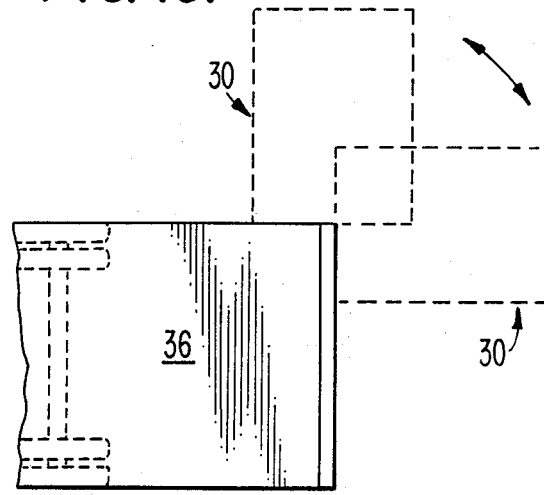
FIG. 19 is a schematic drawing illustrating the movement of an attachment according to this invention around a rear corner of a cargo vehicle.

In addition, in the embodiment of this invention illustrated in the Figures, truck 32 includes tubing 60 and storage rack 62 attached to the underside of truck bed 36 (see FIGS. 2, 17 and 28).

Figure 16:
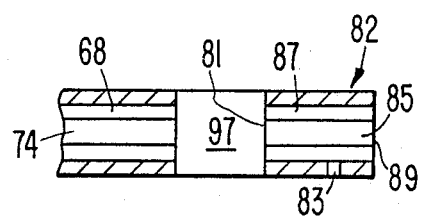
FIG. 16 is a partial side view of the left side tube and left turnstile of the embodiment of this invention illustrated in FIGS. 1-15.
Figure 20:
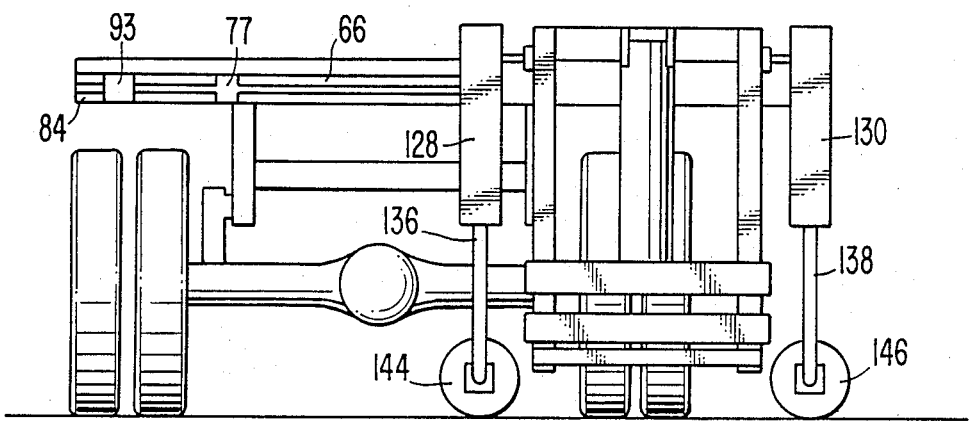
FIG. 20 is a rear view illustrating the movement of the embodiment of this invention illustrated in FIGS. 1-17 around the periphery of the vehicle.

Tubing 60 is attached to the periphery of the underside of truck bed 36 and extends around the sides and back of truck bed 36. Tubing 60 includes left tube 64, rear tube 66 and right tube 68. In the embodiment illustrated in the Figures, tubes 64, 66 and 68 are all rectangular tubes of the same size having elongated slits in their outer faces, such as slit 70 in left tube 64 (see FIG. 2), slit 72 in rear tube 66 (see FIGS. 20 and 26) and slit 74 in right tube 68 (see FIG. 16). Slits 70, 72 and 74 extend the entire lengths of tubes 64, 66 and 68, respectively. The function of slits 70, 72 and 74 will be discussed below.

Tube 68 has four doors 61 spaced apart in the bottom thereof. Doors 61 are spaced apart a distance equal to the spacing between rollers 120–123 (discussed below) and may be rotatably or slidably attached to tube 68. The openings in the bottom of tube 68 resulting from the opening of doors 61 are of a size sufficient for rollers 120–123 to pass through.

In addition, tubing 60 includes turnstiles 82 and 84. Turnstiles 82 and 84 are identical and can be made of sections of the same tubing as tubes 64, 66 and 68. Turnstile 82 is located at the right rear corner of truck bed 36 and turnstile 84 is located at the left rear corner of truck bed 36 (see FIG. 17).

Figure 22:
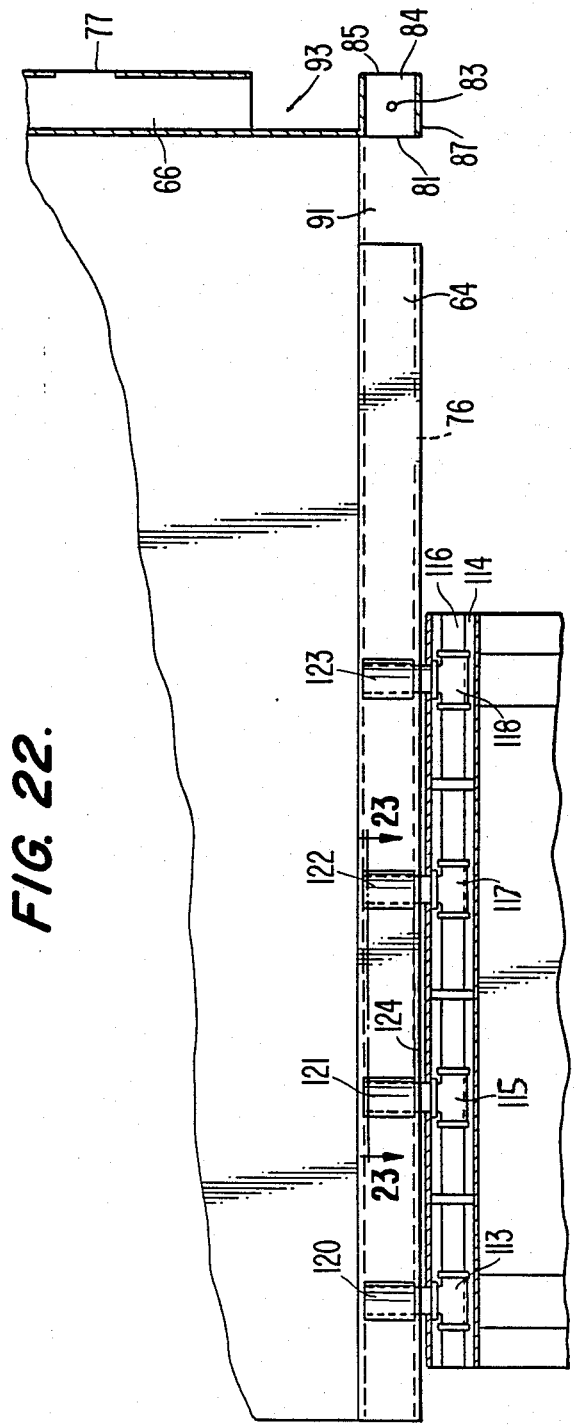
FIG. 22 is a partial top view, partially cross-sectioned for clarity, of the embodiment of this invention illustrated in FIG. 1-21 attached to a truck bed.

Turnstiles 82 and 84 are square (when viewed from the top) and have hole 83 in the center of the bottom plate (see FIG. 22). This hole rotatably engages a bolt or other item such that turnstiles 82 and 84 are pivotable.

Turnstiles 82 and 84 each have open ends 81 and 85 (see FIGS. 16 and 22) and front face 87. Front face 87 has slit 89 (see FIG. 16) therein which matches slits 70, 72 and 74. Turnstiles 82 and 84 are spaced from the ends of tubes 64, 66 and 68, forming gaps 91, 93, 95 and 97, for the purposes discussed below.

Figure 18:
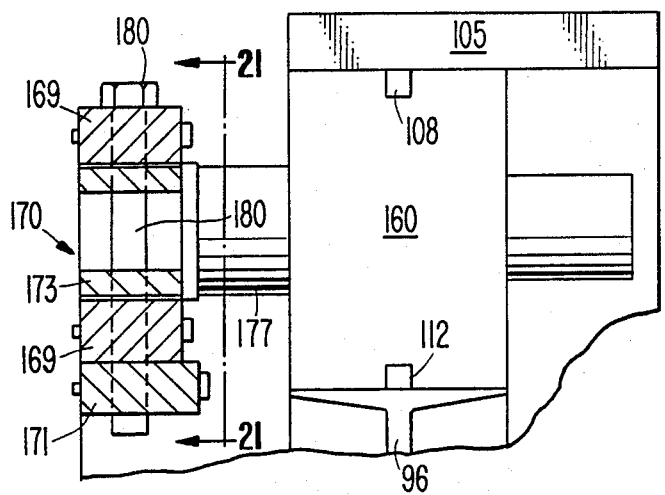
FIG. 18 is a partial rear view, partially cross-sectioned for clarity, of the attachment of the mast to one of the horizontal beam assemblies.

Tubes 64, 66 and 68 have open slots in their outer faces, such as slot 76 in left tube 64 (see FIG. 2), slots 77 and 79 in rear tube 66 (see FIG. 26) and slot 80 in right tube 68 (see FIG. 18). Slots 76, 77 and 79 are spaced equidistance from the center holes 83 in turnstiles 82 and 84. The function of all these slots is discussed in detail below.

Figure 8:
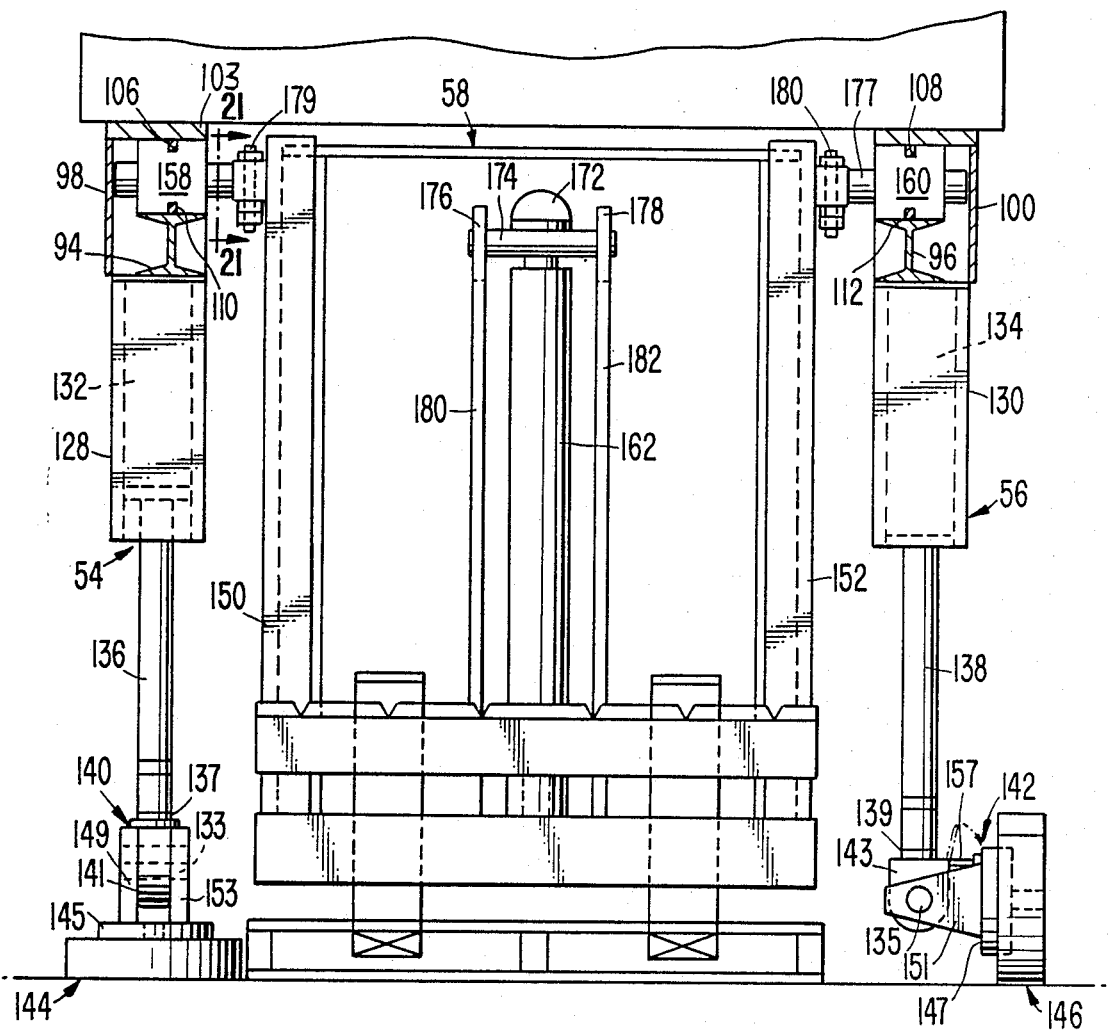
FIG. 8 is a rear view, partially cross-sectioned for clarity, of the mast (including the elevator), horizontal support beam assemblies and leg support assemblies of the embodiment of this invention illustrated in FIGS. 1-7.

Horizontal support beam assemblies 48 and 50 are identical and include I-beams 94 and 96, side plates 98 and 100, back plates 102 and 104, top plates 103 and 105, top guide rods 106 and 108 and bottom guide rods 110 and 112, respectively (see FIGS. 7 and 8).

I-beams 94 and 96, side plates 98 and 100, top plates 103 and 105 and guide rods 106, 108, 110 and 112 extend the length of attachment 30. Side plates 98 and 100 are attached to I-beams 94 and 96 by supports (not illustrated) and spaced therefrom (see FIGS. 7 and 8). This enables the placement of hydraulic hoses, motors, switches, etc. (not shown) in the space between I-beams 94 and 96 and side plates 98 and 100. Top plates 103 and 105 are attached to side plates 98 and 100 and spaced above I-beams 94 and 96, respectively.

End plates 102 and 104 are attached to side plates 98 and 100 and top plates 103 and 105, respectively, to provide a more complete enclosure, thus protecting any hydraulic mechanisms located therein from adverse weather conditions and from other damage. This enclosure also protects persons working adjacent the device from injury if the hydraulic system malfunctions, for example, if one of the hydraulic lines ruptures.

Top guide rods 106 and 108 are attached to the underside of top plates 103 and 105, respectively, and extend the entire length of top plates 103 and 105. Likewise, bottom guide rods 110 and 112 are affixed to the top of I-beams 94 and 96, respectively, and extend the entire length of the I-beams. In this embodiment, guide rods 106, 108, 110 and 112 have a square cross section.

Horizontal support beam assemblies 48 and 50 also include rollers 127 and 129 which are fixed to the exterior of side plates 98 and 100, respectively, at the front end thereof (see FIGS. 7 and 27). The axes of rotation of rollers 127 and 129 is perpendicular to the longitudinal axes of support beam assemblies 48 and 50.

Front cross beam assembly 52 includes outer tube 114, inner tube 116, tees 113, 115, 117 and 118, rollers 120, 121, 122 and 123 and bridge 124. Inner tube 116 is located within outer tube 114 (see FIG. 5). Outer tube 114 and inner tube 116 extend between, and are connected on their respective ends to I-beams 94 and 96, thus forming a fixed frame. In the embodiment illustrated in the Figures, outer tube 114 has a rectangular cross section and inner tube 116 has a circular cross section.

The diameter of the outer surface of inner tube 116 is less than the smallest width of the inner surface of outer tube 114. For example, inner tube 116 may have a two inch diameter, while outer tube 114 may be three inches by four inches.

Rollers 120–123 are attached to inner tube 116 by tees 113, 115, 117 and 118, respectively. In this embodiment, tees 113, 115, 117 and 118 are equally spaced along inner tube 116. Inner tube 116 is rotatably received within the "tops" of tees 113, 115, 117 and 118. The "stems" of tees 113, 115, 117 and 118 extend through slits 70, 72 or 74 (depending on the location of attachment 30) in tubes 64, 66 and 68, respectively, and through orifices 126 in outer tube 114 (see FIG. 5). Orifices 126 are larger than the diameter of tees 113, 115, 117 and 118 so that tees 113, 115, 117 and 118 may rotate around inner tube 116.

The ability of tees 113, 115, 117 and 118 to rotate around inner tube 116 renders attachment 30 capable of use on uneven terrain. Rollers 120–123 and tees 113, 115, 117 and 118 can rotate around inner tube 116 if attachment 30 is placed on terrain of a different height than truck bed 36.

Figure 5:
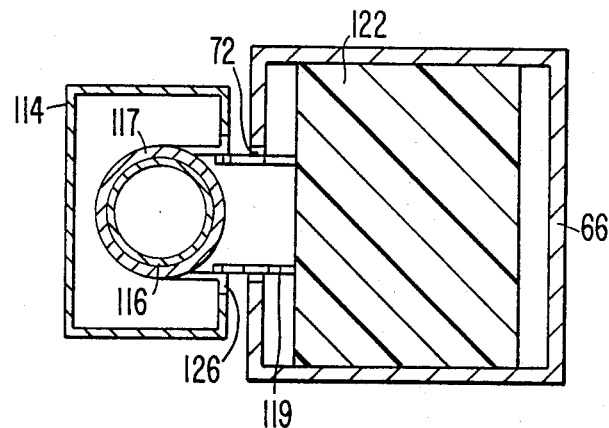
FIG. 5 is a cross-sectional view taken along reference line 5—5 of FIG. 4.

Rollers 120–123 are connected to tees 113, 115, 117 and 118 by shafts such as shaft 119 (see FIG. 5). The shafts have one end received within tees 113, 115, 117 and 118, and have rollers 120–123 rotatably attached to the other end.

Rollers 120–123 are snugly received within tube assembly 60 and thus roll within tubes 64, 66 and 68. Rollers 120–123 roll along the periphery of truck bed 36 as illustrated by the double-headed arrow in FIG. 4. This permits the entire attachment 30 to be moved around the periphery of truck bed 36, as desired, and as discussed below.

Figure 4:
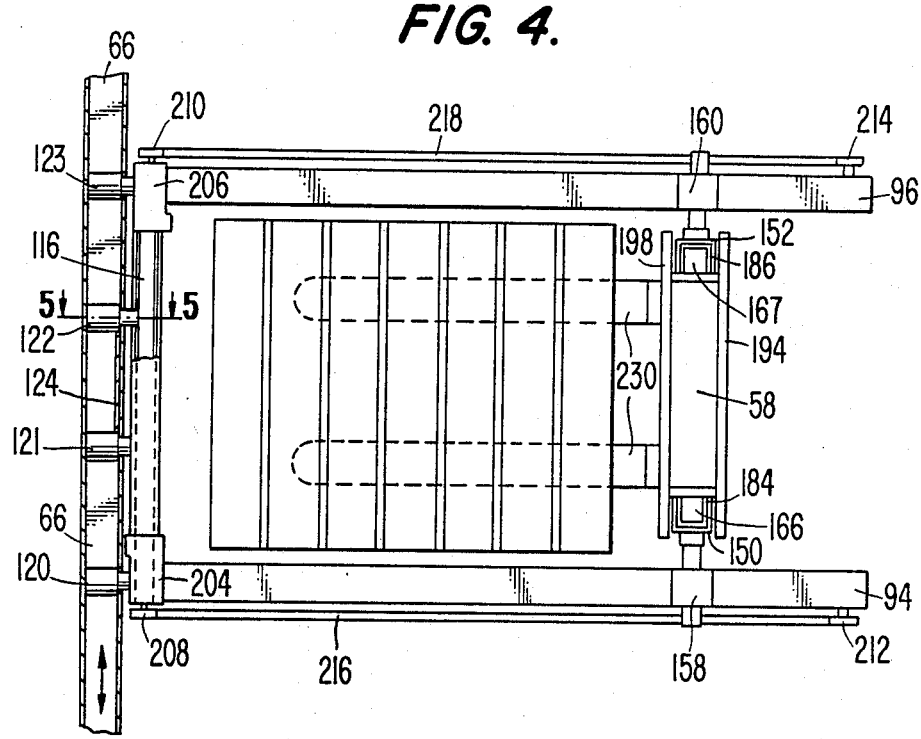
FIG. 4 is a top view, partially cross-sectioned for clarity, of the embodiment of this invention illustrated in FIGS. 1-3 in engagement with a flat bed truck.
Figure 23:
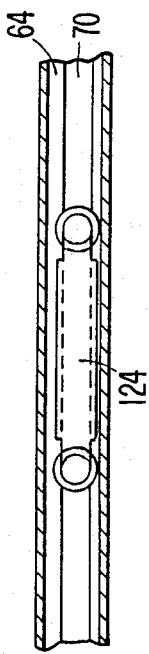
FIG. 23 is a cross-sectional view taken along reference line 23—23 of FIG. 22.

Bridge 124 is attached on its ends to tees 115 and 117 and is located within tubing 60 (see FIGS. 4, 22 and 23). Bridge 124 is a flat plate which has a height greater then the height of slits 70, 72 and 74 so that bridge 124 does not fit through slots 70, 72 and 74.

Leg support assemblies 54 and 56 are identical and include hollow rectangular tubes 128 and 130, hydraulic cylinders 132 and 134, extendable arms 136 and 138, clevis assemblies 140 and 142 and wheel assemblies 144 and 146, respectively.

Figure 3:
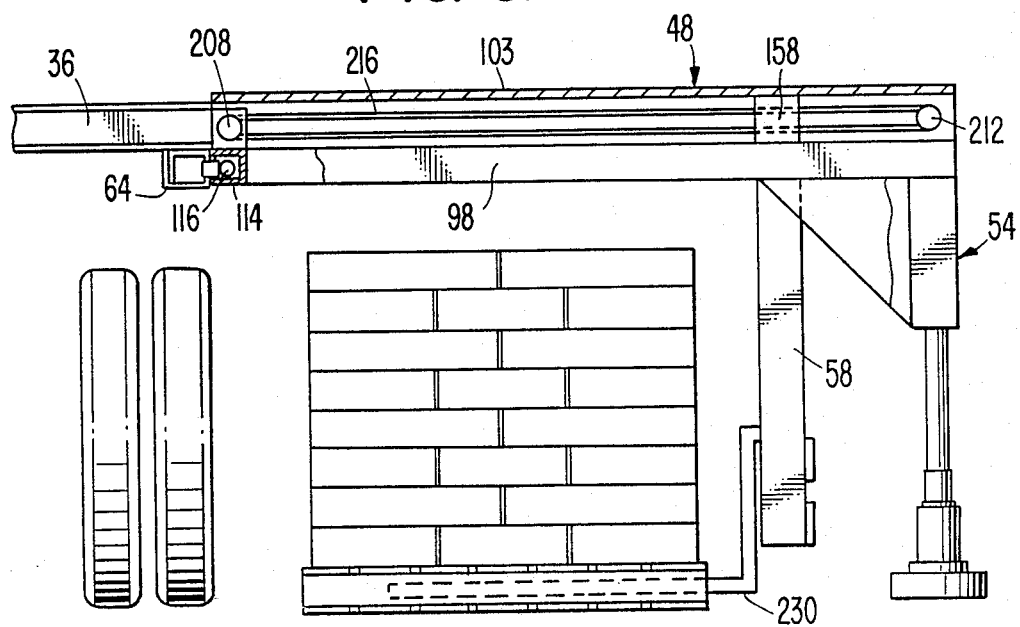
FIG. 3 is a side view, partially cross-sectioned for clarity, of the embodiment of this invention illustrated in FIGS. 1 and 2 in engagement with the side of a flat bed truck.

Rectangular tubes 128 and 130 are attached to the underside of I-beams 94 and 96, respectively, and extend downward therefrom (see FIGS. 3 and 7). Rectangular tubes 128 and 130 are hollow tubes which house hydraulic cylinders 132 and 134, respectively. Hydraulic cylinders 132 and 134 include extendable arms 136 and 138 which extend downwardly from hydraulic cylinders 132 and 134 (and thus from tubes 128 and 130). Extendable arms 136 and 138 have clevis assemblies 140 and 142 attached to their lower ends, respectively. Wheel assemblies 144 and 146 are rotatably attached to clevis assemblies 140 and 142, respectively.

Wheel assemblies 144 and 146 are pivotally attached to extendable arms 136 and 138 by clevis assemblies 140 and 142, respectively. Thus, wheel assemblies 144 and 146 can be oriented perpendicularly to extendable arms 136 and 138 or in parallel to extendable arms 136 and 138 (see FIG. 8).

Clevis assemblies 140 and 142 are identical and include swivel rod assemblies 137 and 139 which are fixedly attached to the lower ends of extendable arms 134 and 136, respectively. Swivel rod assemblies 137 and 139 are constructed such that the lower ends 141 and 143 are free to swivel relative extendable arms 134 and 136, respectively.

Clevis assemblies 140 and 142 also include clevis 145 and 147 which have the hubs of wheel assemblies 144 and 146, respectively, rotatably connected thereto. Clevis 145 and 147 include left flanges 149 and 151 and right flanges 153 and 155, respectively, which project outwardly from the wheels of wheel assemblies 144 and 146, normal to the wheels. Lower ends 141 and 143 are received between left flanges 149 and 151 and right flanges 153 and 155, respectively.

Lower ends 141 and 143 and flanges 149, 151, 153 and 155 have orifices therethrough to receive pins 133 and 135. Pins 133 and 135 pivotally attach flanges 149, 151, 153 and 155, and thus wheel assemblies 144 and 146, to lower ends 141 and 143 of swivel rod assemblies 137 and 139. Therefore, wheel assemblies 144 and 146 may pivot relative extendable arms 136 and 138.

A latch assembly such as latch 157 (see FIG. 8) can be employed to retain a wheel assembly parallel to an extendable arm.

Elevator assembly 58 includes a mast comprised of base plate 148, upright channels 150 and 152, front plates 154 and 156, slide shoes 158 and 160 and hydraulic cylinder 162. Elevator assembly 58 also includes carriage 164, which is slidably attached to the mast, as discussed below.

Base plate 148 is a rectangular plate of uniform thickness. Upright channels 150 and 152 are affixed, on end, to the narrow ends of base plate 148 and extend upward therefrom. Channels 150 and 152 are oriented such that the open end of the channels face each other (see FIG. 4). Front plates 154 and 156 extend across and are attached to the open ends of channels 150 and 152 at the lower portion of channels 150 and 152, respectively (see FIG. 7). Rollers 166 and 167 are attached to front plates 154 and 156, respectively (see FIG. 6).

Slide shoes 158 and 160 are attached to upright channels 150 and 152 by bracket assemblies 168 and 170, respectively.

Bracket assemblies 168 and 170 are identical and include steel cylindrical brackets 169, support brackets 171 and sleeves 173. In the embodiment illustrated in the Figures, a bracket 169 is attached to the outer face of each of upright channels 150 and 152. Brackets 169 are threaded in the center to receive sleeves 173. Support brackets 171 are arc-shaped plates attached underneath brackets 169 for reinforcing support. Sleeves 173 are elongated, hollow cylinders which threadedly engage brackets 169. Sleeves 173 extend outward from upright channels 150 and 152.

Slide shoes 158 and 160 are received between top plates 103 and 105 and I-beams 94 and 96, respectively. Shoes 158 and 160 have grooves in the top and the bottom thereof to engage top guide rods 106 and 108 and bottom guide rods 110 and 112, respectively. Thus, slide shoes 158 and 160 are designed to slide back and forth along the top of I-beams 94 and 96 between I-beams 94 and 96 and top plates 103 and 105.

Rods 175 and 177 are attached to slide shoes 158 and 160, respectively, and extend from slide shoes 158 and 160 inwardly. Rods 175 and 177 are rotatably received in sleeves 173 of bracket assemblies 168 and 170 to affix slide shoes 158 and 160 to upright channels 150 and 152, respectively.

Figure 21:
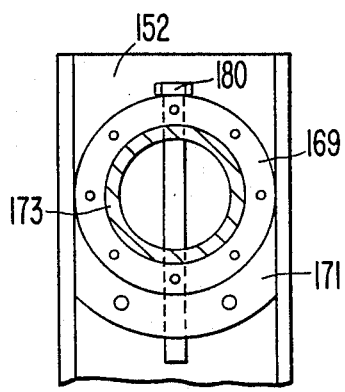
FIG. 21 is a partial cross-sectional view taken along reference line 21—21 of FIG. 8.

Pins 179 and 181 are employed to retain elevator assembly 58 perpendicular to horizontal support beam assemblies 48 and 50. Pins 179 and 181 are received within holes in flanges 169, support brackets 171, sleeves 173 and rods 175 and 177 (see FIGS. 8, 18 and 21). When pins 179 and 181 are received by these holes, elevator assembly 58 is retained perpendicular to support beam assemblies 48 and 50. When pins 179 and 181 are removed, elevator assembly 58 may be rotated relative support beam assemblies 48 and 50.

Hydraulic cylinder 162 is located in the middle of elevator assembly 58 (see FIGS. 7 and 8). The bottom of hydraulic cylinder 162 is attached to the central portion of base plate 148 and hydraulic cylinder 162 extends upward therefrom. Hydraulic cylinder 162 includes extendable arm 172 which extends upward. Axle 174 is attached to the upper end of extendable arm 172. Axle 174 has sprockets 176 and 178 affixed on each end thereof. Chains 180 and 182 interface with sprockets 176 and 178.

Figure 9:
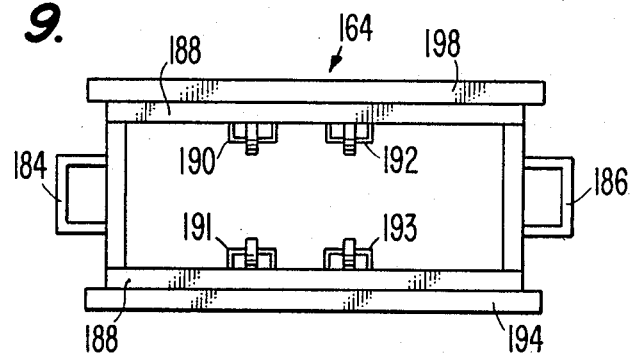
FIG. 9 is a top view of the carriage of the embodiment of this invention illustrated in FIGS. 1-8.
Figure 10:
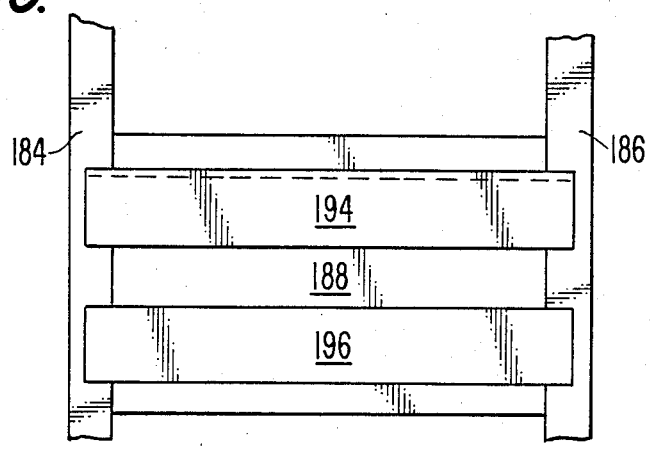
FIG. 10 is a partial front view of the carriage illustrated in FIG. 9.

Carriage 164 includes upright elongated channels 184 and 186, cross plates 188, sprocket assemblies 190–193, front upper plate 194, front lower plate 196, back upper plate 198, back lower plate 199 and side plates 200 and 202 (see FIGS. 9 and 10). The open end of channels 184 and 186 are affixed to side plates 200 and 202, respectively. Side plates 200 and 202 extend between and are connected on their ends to cross plates 188 to form a fixed rectangular frame. Sprocket assemblies 190–193 are attached to the interior of cross plates 188. Upper and lower plates 194, 196, 198 and 199 are flat rectangular plates which are attached to the exterior of cross plates 188.

Upper plates 194 and 198 have notches 195 and 197 in the upper back edge thereof, respectively. Notches 195 and 197 extend the length of upper plates 194 and 198. The function of notches 195 and 197 is discussed below.

Figure 6:
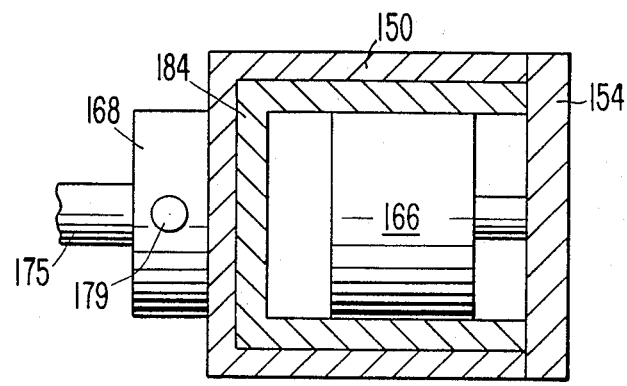
FIG. 6 is a cross-sectional view taken along reference line 6—6 of FIG. 7.

Elevator assembly 58 is assembled such that upright channels 184 and 186 are received within upright channels 150 and 152 (see FIGS. 4 and 6). That is, channels 184 and 186 are received between channels 150 and 152 and rollers 166 and 167, respectively. Rollers 166 and 167 can be a multiplicity of rollers arranged at any angle with respect to channels 150, 152, 184 and 186.

Chains 180 and 182 extend between and interface with sprockets 176, 190 and 191 and sprockets 178, 192 and 193, respectively.

Attachment 30 includes a mechanism to slide elevator assembly 58 relative to horizontal support beam assemblies 48 and 50. This mechanism includes hydraulic motor assemblies 204 and 206, front sprockets 208 and 210, rear sprockets 212 and 214 and chains 216 and 218 (see FIGS. 2 and 4). The hydraulic motor assemblies 204 and 206 are mounted on top of I-beams 94 and 96 and front cross beam assembly 52. Front sprockets 208 and 210 and rear sprockets 212 and 214 are rotatably affixed to I-beams 94 and 96, respectively. The output of motor assemblies 204 and 206 is shafts which rotate front sprockets 208 and 210. Hydraulic motor assemblies 204 and 206 have reversible hydraulic motors so that front sprockets 208 and 210 can be driven in either direction. Rear sprockets 212 and 214 are idler sprockets.

One end of chains 216 and 218 is affixed to the front of slide shoes 158 and 160, respectively. Chains 216 and 218 are then looped around front sprockets 208 and 210, rear sprockets 212 and 214, and then reattached to the back side of slide shoes 158 and 160, respectively.

Figure 25:
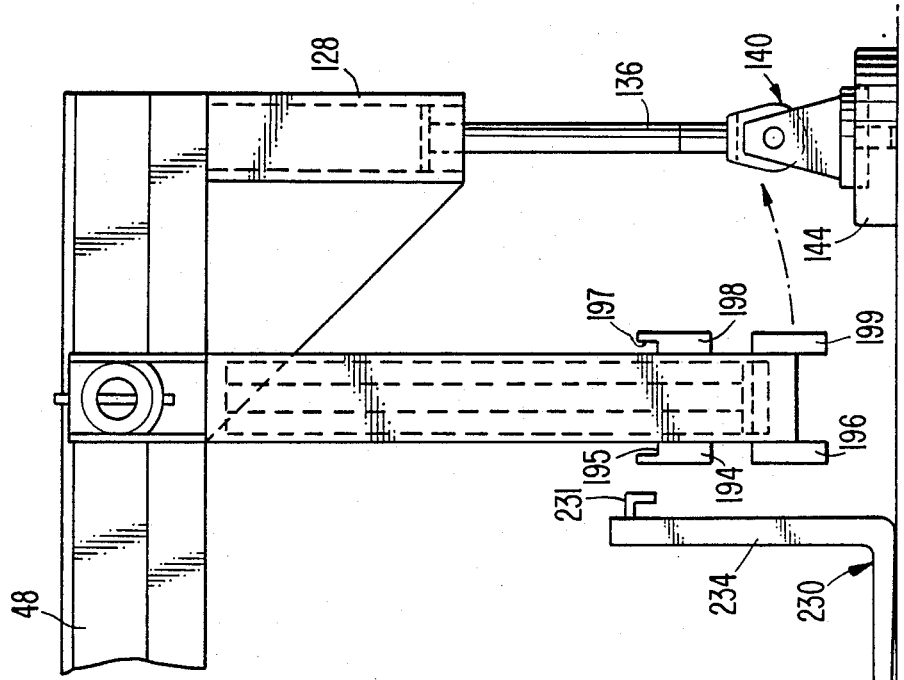
FIG. 25 is a partial side view illustrating the tine assembly, mast and one leg support assembly of the embodiment of this invention illustrated in FIGS. 1-24.

Attachment 30 also includes forklift tines assembly or fork 230 which is attachable to carriage 164. Fork 230 includes platform tines 232 and upright member 234. Carriage 164 is designed such that fork 230 can be attached to either the front side or back side of carriage 164. This is accomplished by hook angle 231 which is affixed to the top back edge of upright member 234. Hook angle 231 is designed to engage notches 195 and 197 (see FIG. 25). When hook angle 231 is in engagement with either notch 195 or 197, the lower portion of upright member 234 is in abutment with one of the lower plates 196 and 199 to retain fork 230.

Figure 26:
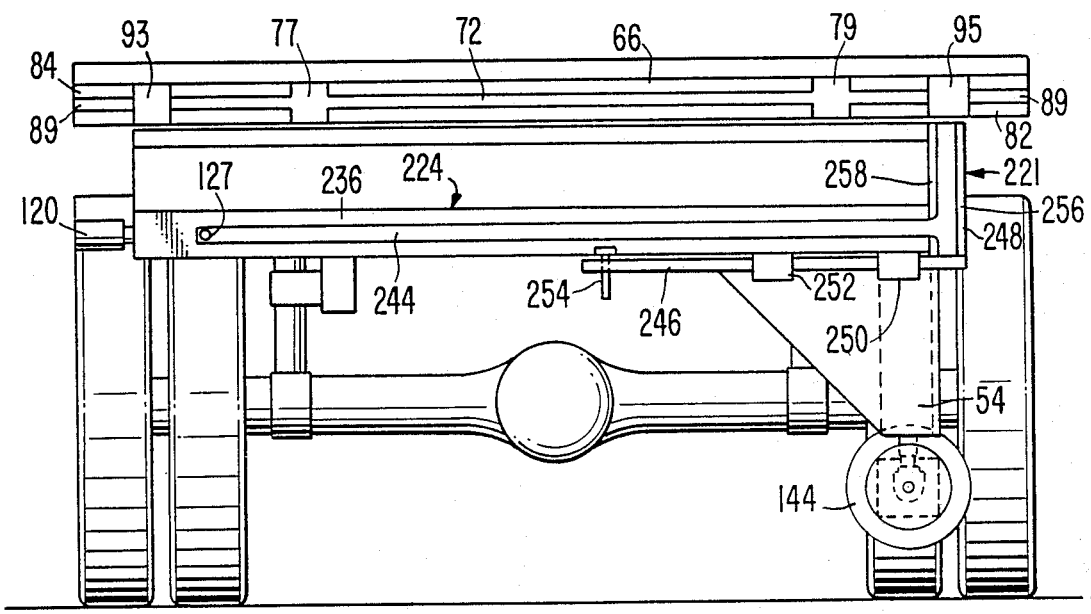
FIG. 26 is a rear view of the embodiment of this invention illustrated in FIGS. 1-25, illustrating the embodiment stored under a truck bed.

In the embodiment illustrated in the Figures, storage rack 62 is located underneath truck bed 36, behind the rear wheels of truck 32 and includes slidable drawers 220 and 221, elongated angles 222 and 224, a plurality of hangers 226, front cross support 260 and back cross support 262 (see FIGS. 26-28). Hangers 226 are attached to, and extend downward from, the bottom of truck bed 36. Elongated angles 222 and 224 are connected to hangers 226 and extend perpendicular to the longitudinal axis of truck bed 36. Cross supports 260 and 262 are attached to and extend between angles 222 and 224 to form the basic frame of storage rack 62.

Angles 222 and 224 have vertical legs 236 and 238 and horizontal legs 240 and 242, respectively. Angles 222 and 224 are oriented such that vertical leg 236 is rearward of horizontal leg 240 and extends upward therefrom and vertical leg 238 is forward of horizontal leg 242 and extends upward therefrom. Vertical legs 236 and 238 have identical slits 244 therein which extend longitudinally from one end of the legs to points close to the second end.

Hangers 226 are L-shaped. Angles 222 and 224 are attached to the base of the "L" of hangers 226. The top of the upright flange of hangers 226 are attached to the underside of truck bed 36.

Slidable drawers 220 and 221 are also L-shaped and include base legs 246 and upright legs 248. Base legs 246 are flat rectangular plates.

Upright legs 248 are comprised of front plates 256 and rear plates 258. Front plates 256 and rear plates 258 are vertical, spaced plates which receive rollers 127 and 129 therebetween.

Storage rack assembly 62 also includes front drawer hangers 250 and rear drawer hangers 252. Base legs 246 are slidably received and retained in front hangers 250 and rear hangers 252. Stop bolts 254 which pass through base legs 246 are provided to prevent base legs 246 from completely passing through rear hangers 252. If stop bolts 254 are removed, the entire attachment 30 can be removed from truck bed 36.

The embodiment of this invention illustrated in the Figures, attachment 30, is utilized as follows. First, tubing 60 is affixed to the underside of truck bed 36 as discussed above. Also, storage rack 62 is affixed under the vehicle, either in front of or behind the rear wheels thereof (see FIGS. 2 and 17). Assuming attachment 30 is in storage rack 62 (as shown in FIG. 26) and that it is desired to employ assembly 30 to unload one or more of items 37-46 from truck bed 36, the following steps are taken.

When attachment 30 is in storage rack 62, elevator assembly 58 is positioned parallel to horizontal support beam assemblies 48 and 50. Support beam assemblies 48 and 50 and elevator assembly 58 are resting on elongated angles 222 and 224. Moreover, extendable arms 136 and 138 are fully retracted into hydraulic cylinders 132 and 134, respectively, so that wheel assemblies 144 and 146 are at their maximum height from the ground.

Thus, to utilize attachment 30, attachment 30 must be removed from storage rack 62 by first sliding attachment 30 out of storage rack 62 in the direction of the arrow in FIG. 17. During this movement, rollers 127 and 129 rotatably engage slits 244 in elongated angles 222 and 244.

Attachment 30 is slid out of rack 62 until rollers 127 and 129 exit slits 244 and enter drawers 220 and 221. Drawers 220 and 221 are then slid outward to the position shown in FIG. 28. During this movement, base legs 246 slide relative front drawer hangers 250 and rear drawer hangers 252. Stop bolts 254 engage rear drawer hangers 252 to prevent drawers 220 and 221 from being pulled out too far.

Doors 61 are opened. Hydraulic cylinders 132 and 134 are operated to lower wheel assemblies 144 and 146 in contact with the ground. Elevator assembly 58 can be rotated relative to horizontal beam support assemblies 48 and 50 and latched in place by pins 179 and 181 such that elevator assembly 58 is approximately perpendicular to the ground surface.

Next, hydraulic cylinders 132 and 134 can be further operated to lift attachment 30 (specifically, rollers 127 and 129) out of drawers 220 and 221, through the openings corresponding to doors 61 and into right tube 68. Doors 61 are closed. Drawers 220 and 221 are then pushed back under truck bed 36. Wheel assemblies 144 and 146 are swivelled about swivel rod assemblies 137 and 139, respectively, so that the wheels are oriented parallel to the side of truck bed 36.

Once these steps have been taken, attachment 30 is ready to be moved around the periphery of truck bed 36 to its desired position, with rollers 120-123 moving in tubing 60 and the wheels of wheel assemblies 144 and 146 in contact with the ground.

If it is desired to remove one of the loads 41-46 (see FIG. 1), attachment 30 is merely rolled along the right edge of the truck bed to a position centered on the desired load. During this movement, rollers 121-123 and bridge 124 are in engagement with right tube 68 and tees 113, 115, 117 and 118 are slidably received within slit 74.

If the item to be removed from truck bed 36 is located at the rear of the truck or on the left side of truck bed 36

(items 37–40), then attachment 30 must be maneuvered around at least one rear corner of truck bed 36.

This is accomplished by moving attachment 30 to the rear of truck bed 36. Turnstile 82 is aligned with right tube 68. As attachment 30 nears the rear of truck bed 36, rollers 120 and 121 exit right tube 68 and pass through turnstile 82. Specifically, rollers 120 and 121 pass through gap 97 and open ends 81 and 85 of turnstile 82. Tees 113 and 115 will pass through slit 89 in front face 87 of turnstile 82. Bridge 124 is received within turnstile 82.

Figure 24:
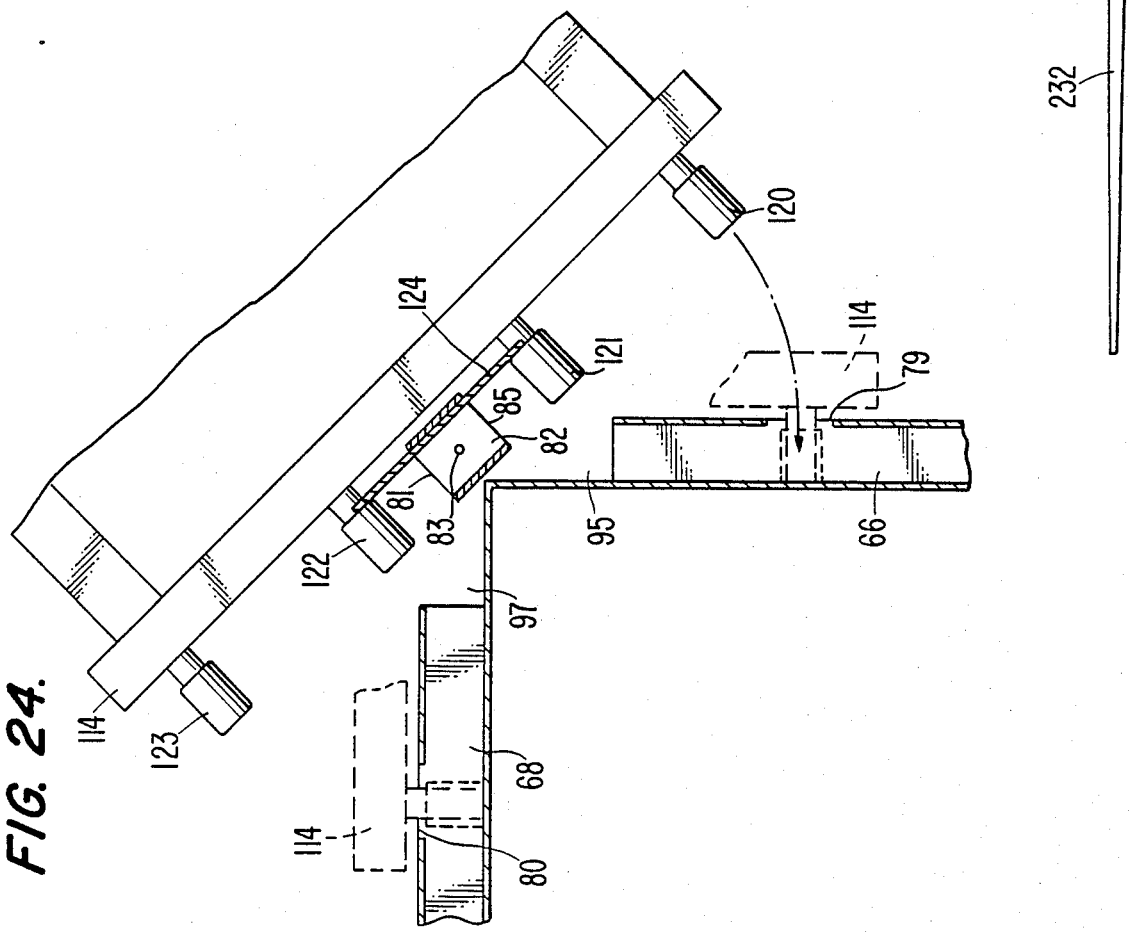
FIG. 24 is a partial top view of the embodiment of this invention illustrated in FIGS. 1-23, partially cross-sectioned for clarity, illustrating the turning of the embodiment about the right rear corner of a truck bed.

Attachment 30 is moved rearward until roller 122 is in gap 97, roller 123 is adjacent slot 80 in right tube 68 and bridge 124 is centered in turnstile 82 (see FIG. 24).

Once attachment 30 is in this position, the entire attachment 30 can be rotated with turnstile 82 as shown in FIG. 24. As turnstile 82 and attachment 30 are rotated, roller 123 passes through slot 80 out of right tube 68 and roller 122 exits gap 97.

As the rotation illustrated in FIG. 24 is continued, roller 120 passes through slot 79 in rear tube 66 and is received and positioned within rear tube 66. Roller 121 is received within gap 95 and turnstile 82 is aligned with rear tube 66. The operator can then push attachment 30 along the rear end of truck bed 36. As this movement is commenced, roller 121 will enter rear tube 66, and rollers 122 and 123 will pass through turnstile 82 and gap 95 and enter rear tube 66.

In this manner, attachment 30 can be positioned anywhere along the rear end of truck bed 36 by moving rollers 120–123 and bridge 124 through rear tube 66 and tees 113, 115, 117 and 118 through slit 72.

If it is desired to position attachment 30 around the left side of truck bed 36 to unload one of items 37–40, attachment 30 is rotated with turnstile 84 in the same manner as it was rotated with turnstile 82. That is, attachment 30 is wheeled along rear tube 66 until rollers 120 and 124 pass out the end of rear tube 66, pass through gap 93, and pass through turnstile 84 which is in alignment with rear tube 66. This movement is continued until roller 127 is positioned in gap 93 and roller 123 is adjacent slot 77. Turnstile 84 is then rotated until it is aligned with left tube 64, with roller 120 entering left tube 64 through slot 76 and roller 121 being received in gap 91.

Attachment 30 can then be positioned adjacent any of the items 37–40 as desired to unload any such items (for example see FIG. 1 wherein attachment 30 is positioned to unload item 40).

Once attachment 30 is positioned adjacent the load or item which it is to be employed to unload, the various elements are further operated as follows.

First, extendable arms 136 and 138 are retracted to lift wheel assemblies 144 and 146 off the ground sufficiently to enable clevis 145 and 147 and wheel assemblies 144 and 146 to be pivoted about pins 133 and 135, respectively. Wheel assemblies 144 and 146 are then pivoted such that the wheels are perpendicular to the extendable arms 136 and 138. Latches 157 can be employed to retain the wheels perpendicular to extendable arms 136 and 138. Hydraulic cylinders 132 and 134 are then operated to lower extendable arms 136 and 138 until wheel assemblies 144 and 146 rest on the ground, approximately parallel to the ground.

Next, fork 230 is attached to the front side of carriage 164 by engaging hook angle 231 in slot 195 of front upper plate 194. Fork 230 is then positioned vertically, by operating hydraulic cylinder 162, to be the same height as the underside of the item to lifted or as the gap in the wood pallet. The raising and lowering of fork 230 by hydraulic cylinder 162 is accomplished as follows.

Hydraulic cylinder 162 functions to raise and lower extendable arm 172. Extendable arm 172 in turn, through axle 174, sprockets 176, 178 and 190–193, and chains 180 and 182, raises and lowers carriage 164. Specifically, extendable arm 172 raises axle 174 and sprockets 176 and 178. Sprockets 176 and 178 are connected to sprockets 190–193 by chains 180 and 182. Thus, sprockets 190 and 193 and carriage 164 are also raised. Fork 230 is attached to carriage 164 as discussed. Carriage 164 is guided vertically by the interaction of channels 184 and 186 within channels 150 and 152, and rollers 166 and 167, respectively.

Once fork 230 is at the desired height, elevator assembly 58 is moved forward so that fork 230 engages the underside of the item or the wood pallet. This movement is accomplished by hydraulic motors 204 and 206 which rotate front sprockets 208 and 210, respectively. As discussed above, chains 216 and 218 are in engagement with front sprockets 208 and 210 and rear sprockets 212 and 214, respectively, such that chains 216 and 218 are driven in a loop by motors 209 and 206.

The ends of chains 216 and 218 are attached to slide shoes 158 and 160, respectively. Elevator assembly 58 is affixed to slide shoes 158 and 160 by rods 175 and 177 and bracket assemblies 168 and 170, respectively.

Thus, rotation of front sprockets 208 and 210 pulls slide shoes 158 and 160 in the direction sprockets 208 and 210 are rotating. This slides slide shoes 158 and 160 along the top of I-beams 94 and 96, respectively, and thus slides elevator assembly 58 relative beam support assemblies 48 and 50.

This movement is continued until fork 230 engages the underside of the item or the wood pallet being removed. Once fork 230 is in engagement with the item or pallet being removed, carriage 164, and thus fork 230, is further raised by hydraulic cylinder 162. This lifts the item or pallet off truck bed 36. The item can then be removed from the truck by reversing the previous direction of sprockets 208 and 210 such that slide shoes 158 and 160, respectively, are moving away from truck bed 36. Once the item or pallet being removed has cleared the edge of truck bed 36, it can be lowered to the ground in one of two ways discussed below, depending on the width of the load.

If the width of the load is less than the interior width between horizontal side beam assemblies 48 and 50, the item or pallet can be simply unloaded by lowering carriage 164 via hydraulic cylinder 162 until the item or pallet rests on the ground (see FIGS. 3 and 4). This is achieved by the reverse of the process discussed above. That is, extendable arm 172 is lowered, which lowers axle 174 and sprockets 176 and 178, which in turn lowers sprockets 190–193 and carriage 164.

Once the load or item is on the ground, elevator assembly 58 can be further slid backwards away from the truck bed 36 until fork 230 is clear of the item or withdrawn from the wood pallet being unloaded. Carriage 164 can then be raised and attachment 30 repositioned to move another load or attachment 30 can be redirected into storage rack 62.

However, obviously a different approach must be taken to unload the item if the item or pallet being removed is wider than the space between horizontal support beams assemblies 48 and 50 (for example, load 40).

Figure 11:
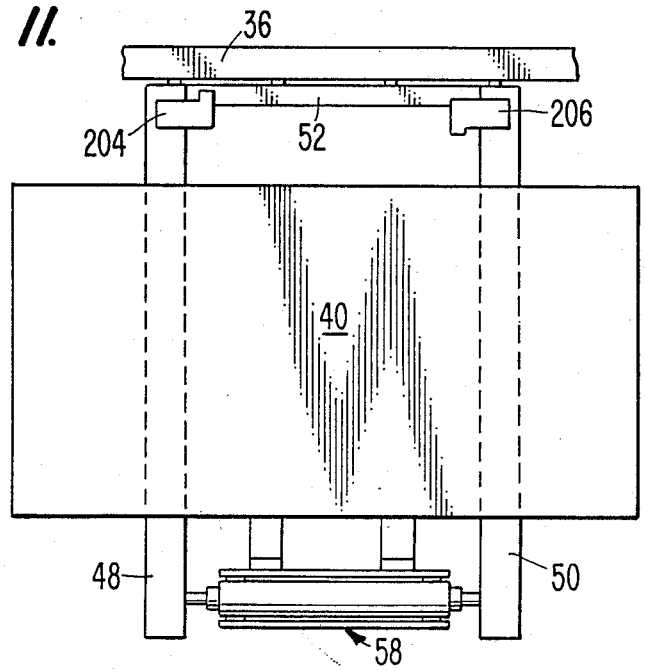
FIG. 11 is a top view of the embodiment of this invention illustrated in FIGS. 1-10, illustrating one stop in the unloading of a wide item.
Figure 12:
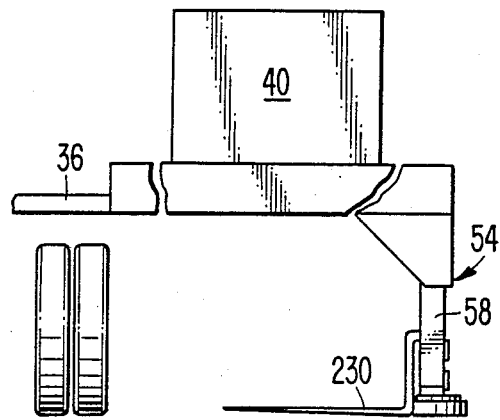
FIGS. 12-15 are side views illustrating, in sequential steps, the process of unloading a wide item from a vehicle using the embodiment of this invention illustrated in FIGS. 1-11.

In this situation, the same initial steps as taken in unloading a narrow load are followed, up to when the wide load (load 40) clears truck bed 36. Once load 40 has cleared truck bed 36, the operator continues backing load 40 up a distance at least equal to the length of elevator assembly 58 and fork 230 parallel to the longitudinal axis of horizontal support beam assemblies 48 and 50 (see discussion below). Carriage 164 is then lowered until load 40 is resting across horizontal support beam assemblies 48 and 50 (see FIGS. 11 and 12).

Figure 13:
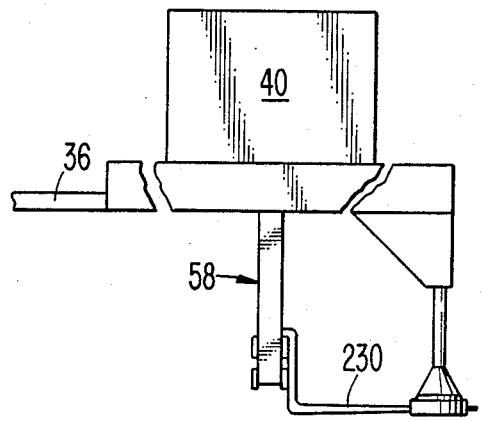

Elevator assembly 58 is slid further away from truck bed 36 until fork 230 clears load 40. Hydraulic cylinder 162 is then operated to lower carriage 164 to its lowermost position. Fork 230 is removed from the front side of carriage 164 by removing hook angles 231 from slot 195 and is attached to the back side of carriage 164 by inserting hook angles 231 into slot 197 (see FIG. 25). Elevator assembly 58 is slid towards truck bed 36, as shown in FIG. 13, with elevator assembly 58 fitting beneath load 40.

Figure 14:
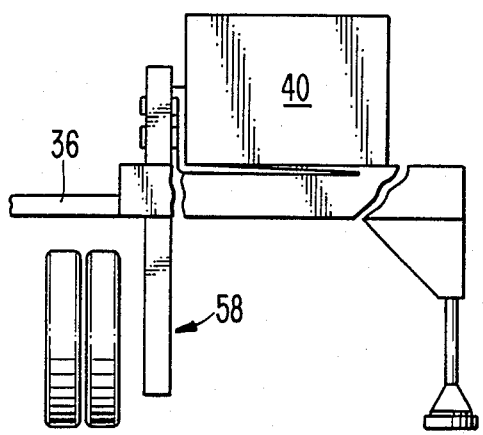
Figure 15:
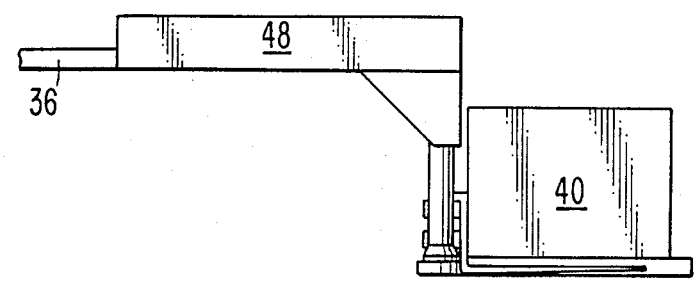

Once elevator assembly 58 is positioned between truck bed 36 and load 40, carriage 164 can be raised and elevator assembly 58 slid backward until fork 230 is brought into engagement with the opposite side of load 40 previously engaged (see FIG. 14). Carriage 164 can then be raised to lift load 40 off of horizontal support beam assemblies 48 and 50. Hydraulic motors 204 and 206 are operated to move slide shoes 158 and 160, respectively, and elevator assembly 58 rearward until load 40 is beyond the back end of attachment 30. Hydraulic cylinder 162 is then operated to lower load 40 to the ground as shown in FIG. 15.

Of course, items can be loaded onto truck bed 36 in the same manner, following the reverse steps.

When it is desired to relocate attachment 30 in storage rack 62, the reverse steps from those described above are followed. First, hydraulic cylinders 132 and 134 are operated to lift wheel assemblies 144 and 146 off the ground. Wheel assemblies 144 and 146 are then pivoted 90° so that they are perpendicular to the ground surface and to the horizontal support beam assemblies 48 and 50. Hydraulic cylinders 132 and 134 are then operated to lower wheel assemblies 144 and 146 until the wheels are back in contact with the ground. Attachment 30 can then be pushed back around the periphery of the truck bed in the same manner as it was moved into position.

Once attachment 30 is positioned adjacent storage rack 62 with rollers 120-123 positioned above doors 61, drawers 220 and 221 are slid out to the position illustrated in FIG. 28. Rollers 127 and 129 are positioned above the slots formed by front plates 256 and rear plates 258 of drawers 220 and 221, respectively. Pins 179 and 181 are withdrawn and elevator assembly 58 rotated to be approximately parallel horizontal support beam assemblies 48 and 50. Rod 264 can be placed across support beam assemblies 48 and 50 to support elevator assembly 58 in this position (see FIG. 27). Doors 61 are opened.

Hydraulic cylinders 132 and 134 are operated to lower attachment 30 until rollers 127 and 129 pass between front plates 256 and rear plates 258 and are in alignment with slits 244 in elongated angles 222 and 224, respectively. Wheel assemblies 144 and 146 are swivelled, via swivel rod assemblies 134 and 139, about extendable arms 136 and 138, respectively, such that the wheels are parallel to horizontal support beam assemblies 48 and 50.

Attachment 30 can then be pushed inward until rollers 127 and 129 reach the ends of the slits 244 in elongated angles 22 and 224, respectively. Drawers 220 and 221 are pushed to the inner position.

When attachment 30 is properly placed with storeage rack 62, no part thereof extends beyond the side of truck bed 36.

Once given the above disclosure, many other modifications, improvements and embodiments will become obvious to those skilled in the art. All such other modifications, improvements and embodiments are considered to be within the scope of this invention as defined by the following claims:

I claim:

1. A load-carrying attachment for a cargo carrying vehicle to unload cargo from or load cargo onto said vehicle when said attachment is attached to said vehicle, said attachment comprising:
    a pair of spaced horizontal support beam assemblies having first and second ends, said beam assemblies being connected, said first ends of said support beam assemblies being attachable to said vehicle;
    first and second leg members, said first leg member being attached to one of said support beam assemblies, said second leg member being attached to the other of said support beam assemblies;
    a mast slidably attached to said beam assemblies such that said mast is movable along said beam assemblies, said mast being positioned between said beam assemblies, said mast also being rotatably attached to said beam assemblies;
    a carriage slidably attached to said mast such that said carriage can slide parallel to the longitudinal axis of said mast;
    first means removably attachable to said carriage for engaging a load; and
    receiving means attached to said vehicle for receiving said first ends of said support beam assemblies, said receiving means extending along the sides and back of said vehicle such that said attachment may be moved around the sides and back of said vehicle;
    wherein said attachment is capable of unloading cargo from or loading cargo onto said vehicle when said horizontal support beam assemblies are attached to said vehicle.

2. A load-carrying attachment according to claim 1 further comprising
    a cross beam attached to the first ends of said support beam assemblies; and
    rollers attached to said cross beam which engage said receiving means.

3. A load-carrying attachment according to claim 2 wherein
    said receiving means is hollow tubing which receives said rollers therein.

4. A load-carrying attachment according to claim 3 wherein
    said tubing is attached underneath the bed of said vehicle.

5. A load-carrying attachment according to claim 1 wherein
    said leg members are attached to said second ends of said support beam assemblies;
    said leg members are extendable and retractable to vary the height of said second ends of said support beam assemblies.

6. A load-carrying attachment according to claim 5 wherein said leg members have top and bottom ends;
said top ends being attached to said support beam assemblies;
said bottom ends including a wheel member.

7. A load-carrying attachment according to claim 6 wherein
said leg members include a hydraulic cylinder having an extendable arm;
said wheel members being rotatably attached to said extendable arms;
said wheel members being pivotally attached to said extendable arms such that said wheel members can be oriented in parallel or perpendicular to said extendable arms.

8. A load-carrying attachment according to claim 1 wherein
said mast includes a cross beam and means for engaging said support beam assemblies such that said cross beam is movable along said support beam assemblies;
said means being located on the ends of said cross beam.

9. A load-carrying attachment according to claim 8 wherein
said support beam assemblies include an elongated beam;
said means for engaging said support beam assemblies are slide shoes which are slidable along the top of said elongated beams.

10. A load-carrying attachment according to claim 9 wherein
said mast includes spaced elongated upright members;
said carriage being slidable along said upright members.

11. A load-carrying attachment according to claim 10 wherein
said mast includes a hydraulic cylinder operable to raise and lower said carriage.

12. A load-carrying attachment according to claim 11 wherein
said carriage has a front side facing said first ends of said support beam assemblies and a back side facing away from said first ends of said support beam assemblies;
said first means being selectively attachable to said carriage such that said first means extends forward from said front side of said carriage or rearward from said back side of said carriage.

13. A load-carrying attachment according to claim 12 wherein
said first means is a fork.

14. A load-carrying attachment according to claim 1 further comprising
a storage rack located underneath the bed of said vehicle, said storage rack receiving said support beam assemblies, said mast and said carriage therein when said attachment is not in use.

15. A load-carrying attachment according to claim 14 wherein
said storage rack is located behind the rear wheels of said vehicle.

16. A load-carrying attachment according to claim 1 further comprising
said receiving means including hollow tubing connected to the sides and back of said vehicle, said tubing having an outer face;
a cross beam attached to said support beams;
spaced rollers attached to said cross beam, said rollers being received within said hollow tubing; and
a cornering mechanism comprising rotatable turnstiles located on the corners of said hollow tubing, said turnstiles capable of receiving said rollers therethrough.

17. A load-carrying attachment for a cargo carrying vehicle to unload or load said vehicle when said attachment is attached to said vehicle, said attachment comprising:
a pair of spaced horizontal support beams having first and second ends;
a cross beam extending between and connecting said support beams, said support beams and said cross beam forming a fixed frame;
spaced rollers attached to said cross beam;
first and second leg members, said first leg member being attached to one of said support beams, said second leg member being attached to the other of said support beams, said leg members each including a hydraulic cylinder assembly to adjust the height of said support beams;
a mast slidably attached to said support beams such that said mast is movable parallel to the longitudinal axis of said support beams, said mast being positioned between said support beams;
a carriage slidably attached to said mast such that said carriage can slide parallel to the longitudinal axis of said mast, said carriage having a front and a back side, said front side facing said cross beam and said back side facing in the opposite direction; and
means attachable to said carriage for engaging a load, said means being attached to the front or back side of said carriage;
wherein said attachment is capable of unloading cargo from or loading cargo onto said vehicle when said spaced rollers are in engagement with said vehicle.

18. A load-carrying attachment for a cargo carrying vehicle to unload cargo from or load cargo onto said vehicle when said attachment is attached to said vehicle, said attachment comprising:
a pair of spaced horizontal support beam assemblies having first and second ends, said beam assemblies being connected, said first ends of said support beam assemblies being attachable to said vehicle, said horizontal support beam assemblies including an elongated support beam having a top surface;
first and second leg members, said first leg member being attached to one of said support beam assemblies, said second leg member being attached to the other of said support beam assemblies;
a mast slidably attached to said beam assemblies such that said mast is movable along said beam assemblies, said mast being positioned between said beam assemblies, said mast also being rotatably attached to said beam assemblies;
a carriage slidably attached to said mast such that said carriage can slide parallel to the longitudinal axis of said mast; and
first means for engaging a load, said first means being alternatively attachable to said carriage such that said means extends forward of said carriage or rearward of said carriage;
said mast and carriage having a first position wherein said mast and carriage do not extend above said top surfaces;
wherein said attachment is capable of unloading cargo from or loading cargo onto said vehicle when said horizontal support beam assemblies are attached to said vehicle.

* * * * *